Sept. 15, 1959     R. L. COLBY, JR     2,904,142
COMPOSITE STRUCTURE
Filed April 5, 1955     2 Sheets-Sheet 1
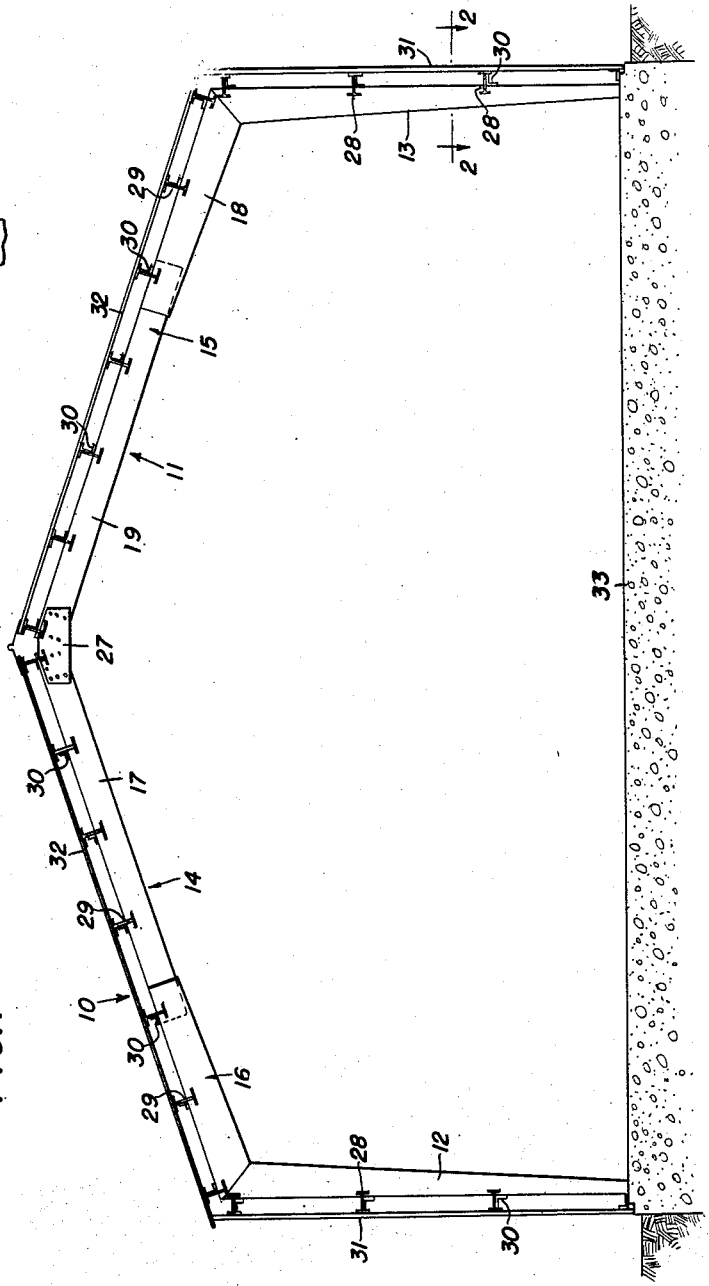
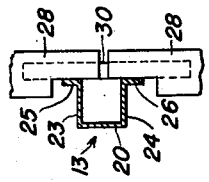
FIG. 2
FIG. 1
INVENTOR
ROY L. COLBY, JR.
BY
ATTORNEY

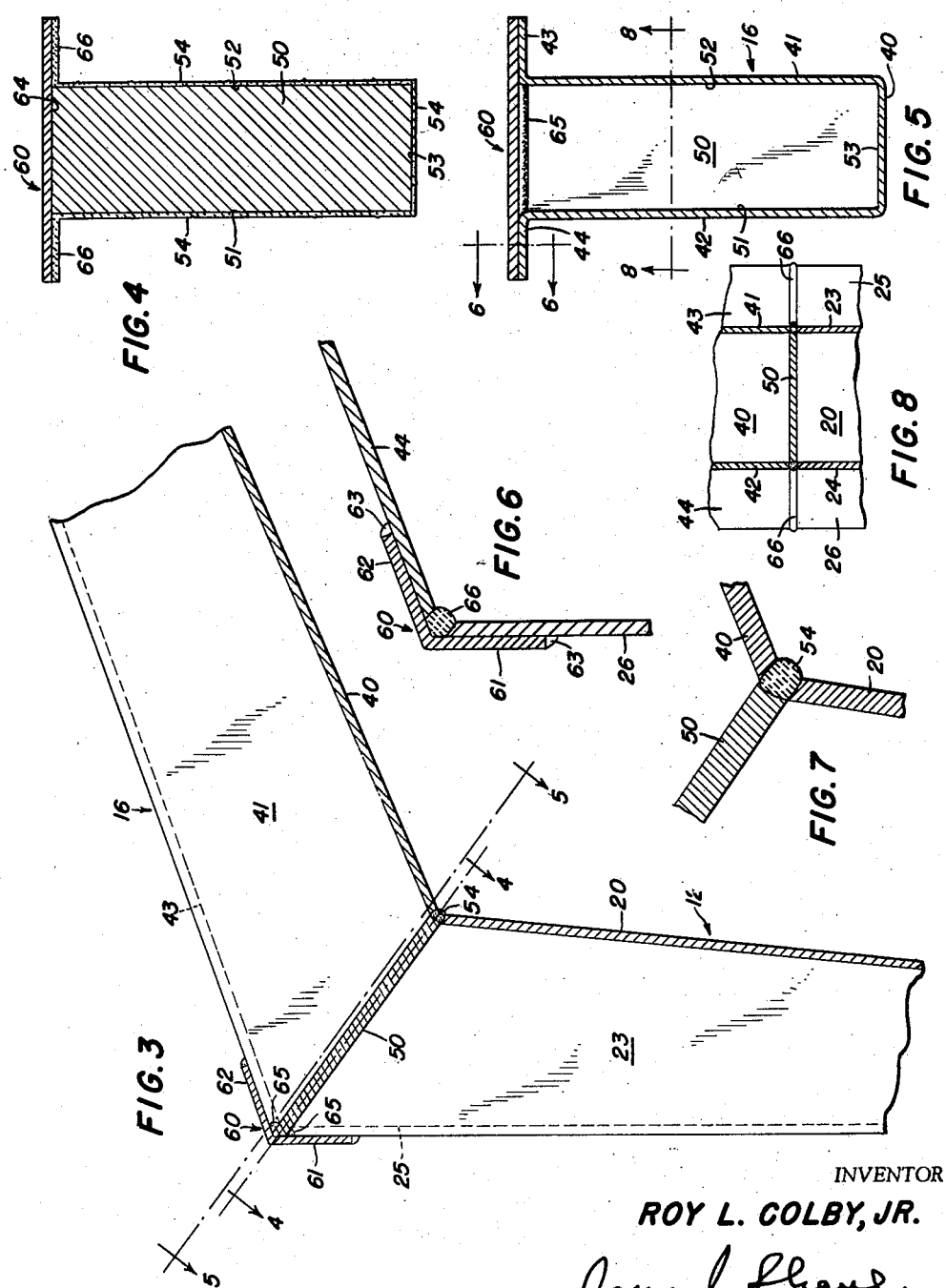

United States Patent Office 2,904,142
Patented Sept. 15, 1959

2,904,142

COMPOSITE STRUCTURE

Roy L. Colby, Jr., Dearborn, Mich., assignor to National Steel Corporation, a corporation of Delaware Application April 5, 1955, Serial No. 499,377

3 Claims. (Cl. 189—36)

This invention relates to composite structures and more particularly to the manner of connecting together the component members of such structures.

Component members of composite structures are usually connected together by means of bolts, rivets or welds. In numerous cases it is structurally advantageous to connect the adjacent ends of the composite members by a full penetration butt weld. Full penetration butt weld connections may be made by following conventional practice when joining composite members having single boundary sections in which the internal space defined by the portions of the sections is proportioned so that a welding operation may be performed both internally and externally of the members. Conventional hot-rolled members of I-shape cross section are an example of this type of members. In conventional I-shape sections the web portions are of appreciable width as compared to the flange portions so that the internal surfaces of the flange portions on both sides of the web portion are spaced sufficiently by the web portion to allow an internal welding operation. Double boundary sections, such as closed rectangular or circular sections, are so characterized as not to permit an internal welding operation. Also, the portions of some single boundary sections are related and proportioned so that the internal space of the section, although open, does not permit a welding operation from within the section. Such single boundary sections may be defined as "restricted single boundary sections." It was not possible, prior to the present invention, to connect members having single boundary sections defining restricted internal spaces or double boundary sections in end-to-end relation by means of full penetration butt welds.

In structures including component members connected in end-to-end relation by means of full penetration butt welds, especially when the composite members are angularly disposed with respect to each other, the weakest point of the composite structure may comprise the weld joint and the overall strength of the composite structure is usually determined by the character of the weld depending upon the skill of the welder. This is of special significance if the weld joint occurs at a highly loaded point of the composite structure, such as the case of a rigid portal frame in which composite members are joined in end-to-end relation in the region of the haunch of the frame.

It is therefore an object of the present invention to provide a novel composite structure including component elements joined in end-to-end relation by a full penetration butt weld.

Another object is to provide a novel composite structure including component members joined together in end-to-end relation by a full penetration butt weld, in which the component members possess a double boundary section.

Another object is to provide a novel composite structure including component members joined together in end-to-end relation by a full penetration butt weld in which the component members possess a single boundary section having portions arranged and proportioned to define a restricted internal space not permitting a welding operation upon the adjacent ends of the component members interiorly of the section.

Still another object of the present invention is to provide a novel arrangement which permits members of a composite structure to be joined together in end-to-end relation by a full penetration butt weld formed externally of the members.

Still another object is to provide an arrangement of the above character in which the members possess a double boundary section or a single boundary section presenting a restricted interior space.

A still further object of the present invention is to provide a novel arrangement which permits the fabrication of a composite structure from component members of double boundary section or of restricted single boundary sections connected together in end-to-end relation by a full penetration butt weld and which also increases the strength of the component structure in the region of the welded connection.

A still further object is to provide a novel arrangement of the above type particularly adapted for connecting composite members having restricted single boundary sections in angular end-to-end relation at the haunch of a rigid portal frame.

Other objects and features of the present invention will appear more fully below from the following detailed description considered in connection with the accompanying drawings which disclose one embodiment of the invention. It is expressly understood that the drawings are designed for purposes of illustration only and not as a definition of the limits of the invention, reference for the latter purpose being had to the appended claims.

In the drawings, in which similar reference characters denote similar elements throughout the several views:

Fig. 1 is an end elevational view of a building construction including a rigid portal frame embodying the principles of the present invention;

Fig. 2 is a view in section taken along the line 2—2 of Fig. 1;

Fig. 3 is an enlarged elevational view, in section, of one of the haunch regions of the rigid portal frame shown in Fig. 1;

Fig. 4 is a view in section taken along the line 4—4 of Fig. 3;

Fig. 5 is a view in section taken along the line 5—5 of Fig. 3;

Fig. 6 is a view in section taken along the line 6—6 of Fig. 5;

Fig. 7 is an enlarged view of a portion of the structure shown in Fig. 3, and

Fig. 8 is a view in section taken along the line 8—8 of Fig. 5.

With reference more particularly to Fig. 1 of the drawings, there is disclosed therein a building construction 10 of the prefabricated type and may be easily assembled and disassembled. The building construction embodies the principles disclosed and claimed in copending application Serial No. 494,936, filed March 17, 1955, for Building Construction, and includes a plurality of similar longitudinally spaced, transversely extending, parallel rigid portal frames, only one rigid portal frame 11 being shown in the drawing. The rigid portal frame 11 includes a pair of side members 12 and 13 and a pair of inclined composite roof members 14 and 15, the composite roof members respectively including roof members 16, 17 and 18, 19. The side members and the roof members are each cold formed from a single piece of light gauge sheet metal material to possess a "hat-shape" cross section as shown in Fig. 2. While the latter figure is a cross-sectional view through the side member 12, both of the side members and the roof members are of similar cross-sectional shape and include an inner web portion 20, spaced side web portions 23 and 24 extending from one side of the inner portion, and flange portions 25 and 26 extending laterally outwardly from the outer longitudinal edges of the side web portions in spaced relation with the inner web portion. While the side web portions 23 and 24 are shown in parallel relation and the flange portions are coplanar and parallel to the inner web portion 20, it is to be expressly understood the different portions of the sections may be differently disposed while falling under the definition of a "hat-shape" member. For example, the inner web portion 20 may be provided with a radius of curvature transversely of the side web portions, while the spaced side web portions 23 and 24 may be inclined with respect to each other. The term "hat-shape" member, as used in this description and in the claims, is intended to define a member having in cross section, a pair of spaced web portions joined together at one of their edges by an inner web portion and being provided with flange portions extending outwardly from their other longitudinal edges. The roof members 16 and 18 are joined at one end to the upper end of respective side members 12 and 13 in the region of the haunches of the rigid portal frame in accordance with the principles of the present invention as described in detail below. The roof members 14 and 15 are joined to the free end of respective roof members 16 and 18 in overlapping, telescopic relationship, while the inner ends of the roof members 17 and 19 are joined together at the ridge of the building by means of a gusset plate 27. The column members of the rigid portal frames are joined together by a plurality of vertically spaced, longitudinally extending girts 28 and a plurality of transversely spaced, longitudinally extending purlins 29, the girts and the purlins being secured to respective column members and roof members by means of angular brackets 30. The girts and purlins 28 and 29 may comprise nailable structural members to which the siding 31 and the roofing 32 of the building may be nailably secured. The lower end of the column members of each portal frame are supported on a suitable foundation, such as a concrete slab 33 and are secured thereto by a bracket arrangement, not shown. The rigid portal frames are subject to maximum bending moment stresses at the haunches of the frames, and the side members 12 and 13, and the roof members 16 and 18, are tapered in a direction away from their respective haunch in accordance with the decreasing bending moment stresses. Also, the side members and the roof members of each frame lie in a common plane, and the members are relatively positioned with respect to the common plane with their inner web portions and their flange portions lying in planes perpendicular to the common planes and defining the inside and outside perimeters of the frame.

As mentioned above, it is an object of the present invention to provide a novel arrangement for joining the component members of a composite structure in end-to-end relation by means of a full penetration butt weld, even though the composite members may possess double boundary or restricted single boundary sections. In addition to allowing the joining of the component members in end-to-end relation by a full penetration butt weld, the arrangement increases the strength of the composite structure in the region of the joint between the component members, even when the component members are angularly disposed with respect to each other, and is particularly adapted to the fabrication of a composite structure required to carry heavy loads at the region of the joint, such as in forming the connection between angularly disposed component members at the haunch of a rigid portal frame where the maximum bending moment stresses occur.

As shown in Figs. 3 through 8 of the drawings, the connections between the side members 12 and 13 and their corresponding roof members 16 and 18 at the haunches of the rigid portal frame 11, are formed in accordance with the principles of the present invention. While the haunch connection between the side member 12 and the roof member 16 is only shown in Figs. 3 through 8 and described in detail below, it is to be expressly understood that the other haunch connection between the side member 13 and the roof member 18 of the portal frame 11, as well as the haunch connections of the other portal frames included in the building 10, may be constructed in a similar manner. As previously described, and as shown in particular in Fig. 2, the side member 12 is of "hat-shape" cross section including an inner web portion 20, spaced parallel side web portions 23 and 24 extending from one side of the inner web portion 20, and coplanar flange portions 25 and 26 respectively extending outwardly from the side web portions 23 and 24 in parallel relation with the inner web portion 20. Also, the roof member 16 is of "hat-shape" cross section, and as shown in Fig. 5, includes an inner web portion 40, spaced parallel side web portions 41 and 42 extending from one side of the inner web portion 40 and coplanar flange portions 43 and 44 extending outwardly from respective side web portions 41 and 42 in parallel spaced relation with the inner web portion 40. The adjacent ends of the side member 12 and the roof member 16 are of similar cross-sectional shape, and lie in spaced parallel planes disposed at an acute angle with respect to the longitudinal axis of respective members, to form, when the members are joined together in the relationship shown in Fig. 3, an obtuse angle presenting the desired angular relationship between the roof member 16 and the side member 12. Also, the side member 12 and the roof member 16 are in complementary relation with portions of the adjacent end of each member opposite corresponding portions of the adjacent end of the other member.

A flat plate or diaphragm 50 is symmetrically positioned in the region of the adjacent ends of the side member 12 and the roof member 16 in a plane parallel to the planes of the adjacent ends of the members. The plate 50 is of a shape to occupy substantially completely the area defined by the inner web portions and the side web portions of the members at their adjacent ends, and is of a width to position its edges in contiguous relation with the inside marginal edges of corresponding inner web portions and side web portions of the members. In particular, as shown more clearly in Figs. 4 and 5, the side member 12 and the roof member 16 define, at their adjacent ends, an internal area of similar rectangular shape bounded by the internal surfaces of respective inner web portions 20 and 40 and side web portions 23, 24 and 41, 42. The shape of the plate 50 corresponds to the shape of the internal areas defined by the members at their adjacent ends, and includes, as shown in Figs. 4 and 5, parallel side edges 50 and 51 and an end edge 53. The parallel side edges 51 and 52 of the plate 50 corresponding in length to the internal end dimension of the members between the outer surface of the flange portions and the inside surface of respective inner web portions, while the end edge 53 has a length corresponding to the inside width dimension of the inner web portions in the plane of the adjacent ends of the members. The plate member 50 is positioned with respect to the members 12 and 16 with its plane passing through its longitudinal axis and in parallel relation to its external surfaces being equally distant from and parallel to the planes of the adjacent ends of the members. With the plate member 50 of thickness at least equal to the space between the adjacent ends of the members, the side edges 51 and 52 and the end edge 53 lies in contiguous relation with the inside marginal edges of the side web portions and the inner web portions of both of the members. With this arrangement the side edges 51 and 52 and the end edge 53 of the plate member 50 together with the spaced adjacent end edges of the members present a groove opening exteriorly of the members which extends throughout the perimeter of their inner web portions and side web portions. According to the present invention this groove is employed as a guide for the formation of a full penetration butt weld 54 extending throughout the length of the groove. The butt weld extends throughout the thickness of the inner web portion and the side web portions of the members, and also throughout their length integrally joining corresponding adjacent edges of the members. The butt weld 54 not only forms a fused metal joint between the corresponding edges of the members, but also integrally joins the side edges and the end edge of the plate 50 to corresponding portions of the members.

It is thus apparent that the plate member 50 functions as a back-up plate which allows the adjacent edges of corresponding inner web portions and side web portions of the members to be most efficiently joined together by a full penetration butt welding operation. It is readily apparent upon inspection of Fig. 5 for example, that it would not be possible to join the edges of corresponding inner web portions and side web portions together by a full penetraton butt weld without a back-up plate as provided by the plate 50. This is so, even though the area defined by the inner web portions and the side web portions is not completely closed, due to the relatively great depth of the side web portions as compared to the width of the inner web portions. A rigid portal frame actually constructed in accordance with the principles of the present invention includes a side member and a roof member cold formed from seven gage steel in which the external dimension between the side web portions is six inches and in which the perpendicular dimension from the upper end of the inner web portion to the flange portions is one foot four inches. It would not be possible to join members having cross sectional shapes of these dimensions by means of a full penetration weld without the use of a back-up plate as provided by the plate 50.

It has been determined that the plate member 50 materially increases the strength of the joint between the members 12 and 16 in addition to its function as a back-up plate for the full penetration butt weld. An actual test of a composite structure including members of the type shown in Fig. 3 and joined together in the manner described above, demonstrated that the structure did not fail at the connection between the adjacent ends of the members but that failure occurred in one of the members at a point removed from the joint. While it cannot be said with certainty in what manner the plate member 50 functions to increase the strength of the joint between the members 12 and 16, the function of the plate 50 in distributing forces and in equalizing stresses between the members 12 and 16 and in preventing buckling of the web portions of the members probably has an important influence upon the resulting strength of the connection.

In accordance with another feature of the present invention the joint between the side member 12 and the roof member 16 may be further strengthened by employing an angle member 60 secured to the flange portions and bridging the space between flange portions of each of the members at their adjacent ends. The angle member 60 includes flange portions 61 and 62 inclined with respect to each other at an angle corresponding to the angular relationship between the flange portions of the side member 12 and of the roof member 16, and as shown in Fig. 5, the flange portions are of sufficient length to overlie the flange portions of the members throughout their width and to bridge the space therebetween. The flange portions 61 and 62 are adapted to lie in parallel contiguous relation with the outside surfaces of the flange portions of the members, and may be joined to the latter flange portion by fillet welds 63. The end edge 64 of the plate 50 is secured to the inside surface of the angle member 60 along the line of intersection of the flange portions 61 and 62 by means of fillet welds 65. The angle member 60 also functions as a back-up plate for joining the spaced edges of corresponding flange portions of the member 12 and the member 16 by means of a full penetration butt weld. This function of the angle member 60 is shown in Fig. 6, in which the adjacent ends of the flange portions 26 and 43 are joined by full penetration butt weld 66. Furthermore, the angle member 60 strengthens the flange portions of the members at the region of the joint between the members.

A pair of structural members may be joined together in accordance with the present invention in the following manner. After the members 12 and 16 are fabricated and their ends to be joined together are cut at the proper angle to provide the desired angular relationship between the members in both planes, the plate member 50 is formed in accordance with the internal dimensions of the members at their ends to be joined. The plate member may then be held in the proper relationship with the angle member 60, by means of a jig, and secured to the angle member 60 at one of its ends by means of fillet welds 65. The members 12 and 16 may then be placed in a suitable jig and maintained in the desired angular relationship with their adjacent ends laying in spaced parallel planes. The plate 50 is then inserted into the open side of the members with its side edges 51 and 52 and its free end edge 53 in contiguous contact with corresponding edges of the inner web portions and the side web portions of the members. With the plate member in this position, the flange portions 61 and 62 of the angle member 60 overlie the ends of the flange portions of the members in the manner shown in Figs. 3 and 6. The plate member 50 is maintained in the proper relationship with the adjacent ends of the members by the action of the angle member 60, however, additional jig means may be employed if desired. The adjacent ends of the members may then be integrally secured together by forming a full penetration butt weld extending throughout the length of the inner web portions and the side web portions of the members. Also, the adjacent ends of the flange portions of the members may be joined together by a full penetration weld, and the flange portions of the angle member 60 may be secured to the outer surface of the flange portions of the members by fillet welds. Thus, in a joint formed in accordance with the principles of the present invention all of the welds required to integrally connect adjacent portions of the members are of the open type which may be properly formed to provide a strong bond between the members.

If may be desirable in some cases, instead of employing an integral angle member 60, to secure separate plates across the flange portion of the members at their adjacent ends with the adjacent edges of the separate plates laying in the respective planes of the adjacent ends of the members. In this arrangement the plate 50 would be proportioned so that its end edge 64 is in contiguous relation with the adjacent inside marginal edges of the separate plates, and a groove for a full penetration butt weld would extend across the space between the flange portions of the members. The full penetration butt weld would not only join the adjacent edges of the separate plates but would secure the separate plates to the plate 50. This manner of joining the members illustrates application of the principles of the present invention to the formation of a composite structure by connecting members having double boundary sections.

There is thus provided by the present invention a novel arrangement for forming a composite structure by joining component members by means of full penetration butt welds. The arrangement makes it possible to join by full penetration butt welds members of double boundary sections or of restricted single boundary sections which could not be joined by a full penetration butt weld following conventional practices. Also, the arrangement is characterized in such a manner as to increase the strength of the point between the component members beyond the strength provided by the full penetration butt weld, and has particular utility in joining component members in angular relationship such as the side member and the roof members at the haunches of a rigid portal frame structure.

Although several embodiments of the invention have been disclosed and described above it is to be expressly understood that various changes and substitutions may be made therein without departing from the spirit of the invention as well understood by those skilled in the art. Reference therefore will be had to the appended claims for a definition of the limits of the invention.

What is claimed is:

1. A rigid frame including a pair of elongated members joined together in end-to-end relation with their longitudinal axes in relative angular relationship, each member having in cross section an inner web portion, spaced side web portions extending from one side of the inner web portion and flange portions extending laterally outwardly from the side web portions in spaced relation with the inner web portion; the adjacent ends of the members being of corresponding shape and relatively positioned in spaced complementary relationship; a plate member of a thickness at least equal to the space between the adjacent ends of the members and including edges shaped to correspond to the perimeter of the area defined by the inner web portions and the spaced side web portions of the members at their adjacent ends; the plate member being positioned within said area with the edges of the plate member in contiguous relation with the inside marginal edges of corresponding inner web portions and side web portions of the members, a full penetration butt weld formed in the space between the adjacent ends of the members throughout the perimeter of the inner web portions and the side web portions of the members, the butt weld forming a rigid connection between the adjacent ends of the members and between adjacent ends of the members and the plate member, the plate member comprising a structural element at the joint between the adjacent ends of the members and functioning as a back-up plate for the full penetration butt weld, and connecting means between the flange portions of each member comprising an element of angular cross section corresponding to the angular relationship between the longitudinal axes of the members, the element including side portions joined to the flanges of each of the members and bridging the space between the respective side web portions.

2. A rigid frame as defined in claim 1 in which an end edge of the plate member is joined to the element intermediate the side web portions of the members.

3. A rigid frame as defined in claim 2 in which the element overlies and is secured to the outer surfaces of the flange portions of the members and functions as a back-up plate for joining adjacent edges of the flange portions by a full penetration butt weld.

References Cited in the file of this patent

UNITED STATES PATENTS

| 1,630,037 | Stresau | May 24, 1927 |
| 1,747,362 | Graveley | Feb. 18, 1930 |
| 2,717,060 | Collins | Sept. 6, 1955 |

OTHER REFERENCES

The Welding Encyclopedia, page 451.